US 8,262,483 B2

(12) United States Patent
Inubushi

(10) Patent No.: US 8,262,483 B2
(45) Date of Patent: Sep. 11, 2012

(54) GAME TERMINAL, PLAY-DIFFICULTY-LEVEL SETTING APPARATUS, COMPUTER PROGRAM, AND STORAGE MEDIUM

(75) Inventor: Takashi Inubushi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 395 days.

(21) Appl. No.: 12/526,165

(22) PCT Filed: Jan. 29, 2008

(86) PCT No.: PCT/JP2008/051290
§ 371 (c)(1), (2), (4) Date: Aug. 6, 2009

(87) PCT Pub. No.: WO2008/096640
PCT Pub. Date: Aug. 14, 2008

(65) Prior Publication Data
US 2010/0323800 A1    Dec. 23, 2010

(30) Foreign Application Priority Data

Feb. 9, 2007    (JP) .................. 2007-030269

(51) Int. Cl.
*A63F 9/24*    (2006.01)
(52) U.S. Cl. ............... 463/43; 463/15; 463/20; 463/25; 463/40
(58) Field of Classification Search ............ 463/15, 463/20, 25, 40, 43
See application file for complete search history.

(56) References Cited

U.S. PATENT DOCUMENTS

| | | | |
|---|---|---|---|
| 6,210,170 B1 * | 4/2001 | Sorensen et al. | 434/323 |
| 6,450,888 B1 | 9/2002 | Takase et al. | |
| 6,659,873 B1 | 12/2003 | Kitano et al. | |
| 7,347,780 B1 * | 3/2008 | Best | 463/37 |
| 7,892,080 B1 * | 2/2011 | Dahl | 463/10 |
| 2002/0025841 A1 | 2/2002 | Nobe et al. | |
| 2010/0105456 A1 * | 4/2010 | Marufuji | 463/9 |
| 2010/0167809 A1 * | 7/2010 | Perlman et al. | 463/24 |
| 2010/0167816 A1 * | 7/2010 | Perlman et al. | 463/30 |

FOREIGN PATENT DOCUMENTS

| | | |
|---|---|---|
| EP | 0 974 382 A1 | 1/2000 |
| EP | 1 030 281 | 8/2000 |
| EP | 1 127 599 A2 | 8/2001 |
| JP | 2000-300851 A | 10/2000 |

(Continued)

OTHER PUBLICATIONS

Search Report dated Jun. 9, 2011 for Korean Patent Application No. 10-2009-7018778 along with English translation thereof.

(Continued)

*Primary Examiner* — Pierre Eddy Elisca
*Assistant Examiner* — Shahid Kamal
(74) *Attorney, Agent, or Firm* — Sughrue Mion, PLLC

(57) ABSTRACT

A processor of a game terminal estimates energy consumption of a hypothetical player, assuming that the hypothetical player performs at least one reference dance for a play period, on the basis of a step-sequence data element describing the reference dance. The processor of the game terminal generates a data item describing a value corresponding to the estimated energy consumption, and writes, into an in-terminal memory unit, the data item as a difficulty-level data item describing the difficulty level of the reference dance.

12 Claims, 10 Drawing Sheets

FOREIGN PATENT DOCUMENTS

| | | |
|---|---|---|
| JP | 2001-137415 | 5/2001 |
| JP | 2001-161878 A | 6/2001 |
| JP | 2002-6866 A | 1/2002 |
| JP | 2002-85617 A | 3/2002 |
| JP | 2003-38696 A | 2/2003 |
| JP | 2003-150154 A | 5/2003 |
| JP | 2003-290543 A | 10/2003 |
| JP | 2004-216142 A | 8/2004 |
| JP | 2005-205224 | 8/2005 |
| JP | 2006-314434 A | 11/2006 |
| JP | 2006-320707 A | 11/2006 |
| WO | 2006/070914 A1 | 7/2006 |

OTHER PUBLICATIONS

European Search Report issued Sep. 13, 2010 in European Patent Application No. 08710617.5-2218.

Office Action from Japanese Patent Office in Japanese counterpart application No. 2007-030269, mailed Mar. 11, 2008 (with translation).

International Search Report issued Mar. 18, 2008 in International Application No. PCT/JP2008/051290.

* cited by examiner

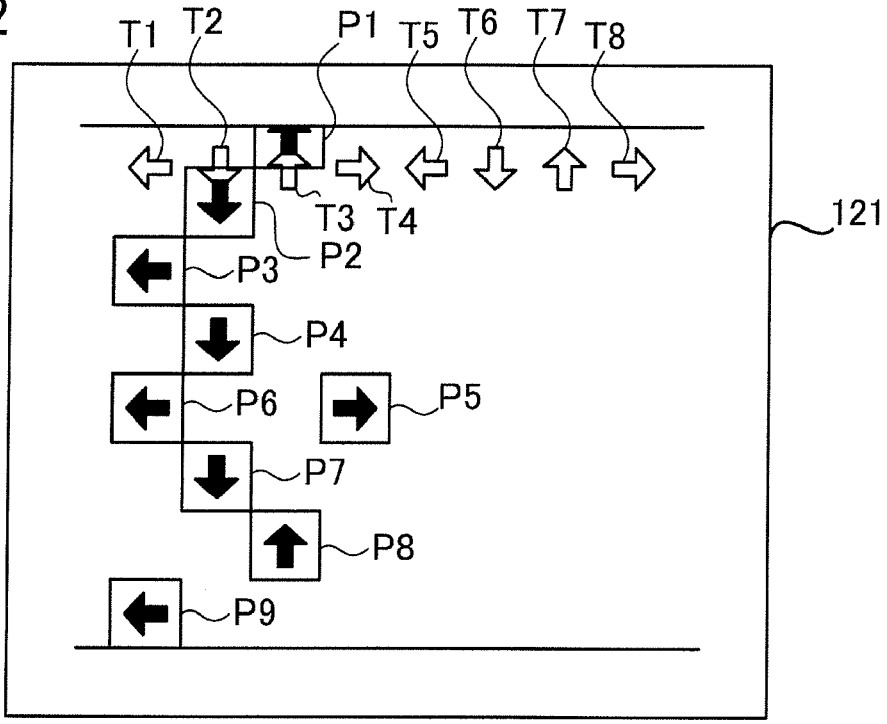
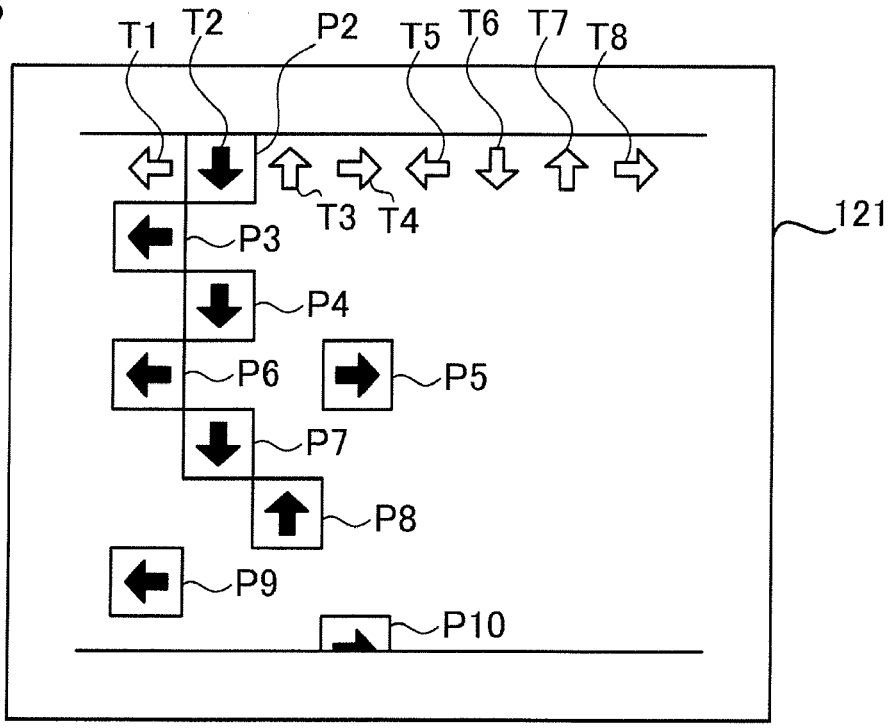

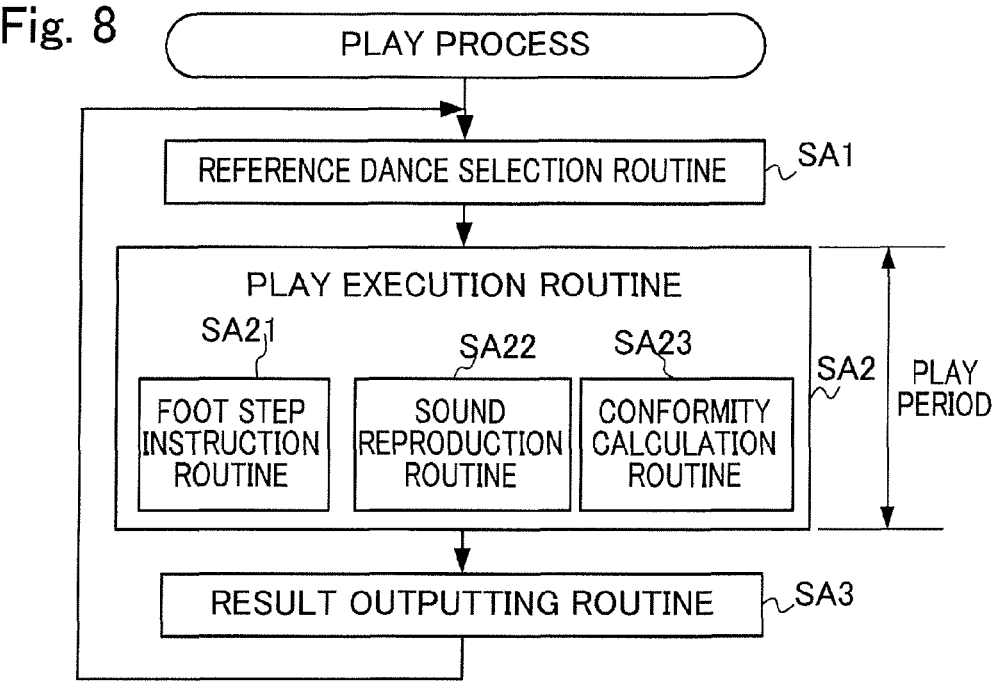

GAME TERMINAL, PLAY-DIFFICULTY-LEVEL SETTING APPARATUS, COMPUTER PROGRAM, AND STORAGE MEDIUM

CROSS-REFERENCE TO PRIOR APPLICATIONS

This application is a filing under 35 U.S.C. §371 of International Application No. PCT/JP2008/051290, filed on Jan. 29, 2008, which claims priority to Japanese Application No. 2007-030269, filed Feb. 9, 2007, the disclosure of each of which is incorporated herein by express reference thereto.

TECHNICAL FIELD

The present invention relates to game terminals, to play-difficulty-level setting apparatuses, to computer programs, and to storage mediums.

BACKGROUND ART

There is a type of computer game in which players should act to conform with a reference action-sequence prepared by the computer, and the computer determines whether or not each reference action conforms with a corresponding action of the player and gives a better evaluation to the player when conformity of actions of the player to the reference action-sequence for a play period is greater. For example, in accordance with a computer game described in JP 2001-161878-A, players should step to conform to a reference dance (reference step-sequence) whereas the computer determines whether or not each reference step conforms with a corresponding step of the player and gives a better evaluation to the player when conformity of steps of the player, for a play period, to the reference step-sequence, is greater.

In a game terminal of this type of computer game, normally, one among a plurality of reference action-sequences is selected by a player, and a procedure depending on the selected reference action-sequence is executed. The player plays in response to the procedure. In addition, a type of this game terminal is known in which the game terminal notifies the player of difficulty levels of reference action-sequences in order to facilitate selection of reference action-sequences. The user of this type of game terminal can select a reference action-sequence with a desirable difficulty level from among a plurality of reference action-sequences. Conventionally, difficulty levels of reference action-sequences are determined on the basis of assessments by a small number of players.

DISCLOSURE OF INVENTION

Problems to be Solved by Invention

For the above-mentioned reasons, conventionally, players must try to play depending on a reference action-sequence for determining the difficulty level of the reference action-sequence, and thus the workload is not small. Furthermore, the workload increases when the number of reference action-sequences of which difficulty levels are to be determined is increased. In addition, the difficulty levels of reference action-sequences are determined on the basis of subjective judgments by a small number of players. Thus, the conventional difficulty levels are not objective difficulty levels. If difficulty levels of reference action-sequences are determined on the basis of assessments by many players, it might be possible to determine the objective difficulty levels. However, this will take a large number of man-hours.

In light of the above-described circumstances, the present invention has been conceived to provide a game terminal, a play-difficulty-level setting apparatus, a computer program, and a storage medium for setting an objective difficulty level of at least one reference action-sequence with a reduced workload for a computer game that gives a better evaluation to a player when a conformity of actions of the player to a predetermined reference action-sequence is greater.

Means for Solving Problems

Description will first be given of terms used in this specification.

A "game" is an activity involving some rules for determining a result of a play (game play), such as soccer and puzzles. The "game" includes a multiple-player game in which two or more participant players or two or more participant teams compete or cooperate and a single player game in which a participant player plays a game to achieve an object or for enjoyment, i.e., a one-person game, and a puzzle. In this specification, there is disclosed a single player game as an example of a game. However, the present invention is not limited to an embodiment of a single player game but encompasses all other types of games. A multiple-player game includes an individual-evaluation type game in which a result of each play is determined for each participant player of the play, and a team-evaluation type game in which a result of each play is determined for each participant team being a group of participant players of this play. Furthermore, as a multiple-player game, a competition type game may be mentioned in which, in each play, participant players of this play or participant teams of the play compete with one another, or a cooperation type game in which participant players or participant teams cooperate with one another. A competition type game includes a match-up game in which participant players or participant teams go against one another.

A "play" of a game is a single act of a player performing a game. Therefore, in a single game, plural plays can be repeated by the same player, and plural plays may be performed simultaneously by plural players. A period of a single play is called a "game period". A game period may be fixed or unfixed, depending on the game. A person who can perform each play is called a "player" of the play or game. In each play, a "result" of the play is an evaluation that a player of the play has as an object. Examples of a result of a play include win or loss, a rank, and a score.

Examples of a game include a play-mode selective game having a plurality of play modes. In the play-mode selective game, each play is one among a plurality of play modes. Play-mode selective games include a game in which different rules are applied to different play modes for determining the result of play, and a game having a single player mode in which the number of participant players is one and a multiple-player mode in which the number of participant players is more than one. In addition, a game in which a player selects a desirable reference action-sequence from among a plurality of reference action-sequences prepared in advance and acts to conform to the reference action-sequence is also a play-mode selective game. In this case, each reference action-sequence is a play mode.

A "computer game" is a game for which a play is carried out by a computer. A computer used for carrying out a computer game is called a "game device" for the computer game. Among game devices for a computer game is a "game terminal" which has a user interface for operation by a player of the computer game. A game terminal may be at least capable of carrying out a single computer game or may also be capable of carrying out plural computer games.

A place at which a game terminal is installed is called a "game place". Examples of a game place include a facility at which visitors use the installed game terminal by paying a fee (for example, a game arcade) and a residential household at which a game terminal is installed. In the former, a visitor in most cases will be a user of a game terminal and will be a player of a computer game; and in the latter, a resident in most cases will be a user of a game terminal and will be a player of a computer game. In the former, a game terminal that has a function of collecting fees from its user (a type of business-use game machine) is installed in most cases; and in the latter, a game terminal that does not have a function of collecting fees from its user (a type of household use game machine) is installed in most cases.

A "network" has terminals and is a generic term for a system in which data can be transmitted and received among plural terminal nodes belonging to the system. Included as an example of a network is a network in which a communication address unique to this network (for example, an IP address (Internet Protocol address)) is assigned to each terminal node belonging to the network. The communication address is used to transmit and receive data among terminal nodes. A "terminal node" is a generic term for a node that serves as a termination of a network from among nodes belonging to the network to which the terminal node belongs. A "node" is a generic term for a device or for a system that transmits or receives data within a network to which the node belongs. Examples of a node include a computer and a network. A network including plural networks as plural nodes is called an "internetwork". Examples of an internetwork include the Internet.

Examples of a network-type game system having plural game terminals include a master-slave type game system, a server-client type game system, and a peer-to-peer type game system. Examples of a master-slave type game system include a game system in which master and slave game terminals are statically determined and a game system in which master and slave game terminals are dynamically determined. Examples of a server-client type game system include a game system in which a server game apparatus and a client game terminal are statically determined, a game system in which both are dynamically determined, and a game system involving a game terminal concurrently working as a server and a client.

A "computer" is a generic term for, from among devices for processing data, one that has a memory for storing data and a processor for executing a computer program stored in the memory. "Data" is a generic term for representing information in a form that is recognizable by a machine such as a computer. Examples of data include data electrically representing information, data magnetically representing information, and data optically representing information. "Information" is a generic term for an object that can be represented by data. The "memory" is a generic term for a device that readably stores data written therein. Examples of the memory include a semiconductor memory, a magnetic memory, and an optical memory. A "computer program" is a generic term for, from among collections of data representing instructions, a collection designating the procedure of a process. Examples of a computer program include a program for causing a computer to carry out a play of a computer game. A "processor" is a generic term for a device that implements an instruction set and that executes a computer program by performing a process of executing instructions represented by data in the computer program in accordance with a procedure designated by the computer program, the computer program being a collection of data representing instructions contained in the instruction set. Examples of a processor include a single CPU (Central Processing Unit) and a collection of plural CPUs.

Examples of a computer include a computer provided with an interface with the outside. Examples of an interface with the outside include: an input unit for receiving input information or data, and an output unit for outputting information or data to the outside. "To input" information is a generic term for an act of generating data representing external information by detection or by measurement. Examples of an input unit include a sensor, a button, and a keyboard. "To output" information is a generic term for an act of representing information represented by data in such a way that information can be perceived by a human. Examples of ways in which information can be perceived by a human include by light, by sound, and by vibration. Examples of outputting information by light include displaying images and blinking of lights. Examples of outputting information by sound include emitting sounds by a speaker and driving a sound structure by a solenoid (for example, ringing a bell). Examples of outputting information by vibration include oscillation by an oscillator.

Description will next be given of the present invention.

The present invention provides a game terminal including: an in-terminal memory unit for storing, for each of a plurality of reference action-sequences, an action-sequence data element for describing a reference action-sequence, identifier for identifying the reference action-sequence, and a difficulty-level data item for describing a difficulty level of the reference action-sequence in such a manner that the action-sequence data element, the identifier, and the difficulty-level data item of the reference action-sequence are mutually associated; an information outputter for outputting, to outside the game terminal, for each of the plurality of reference action-sequences, a piece of information identifying a reference action-sequence and a piece of information describing the difficulty level of the reference action-sequence in such a manner that the pieces of information of the reference action-sequence are mutually associated on the basis of the identifiers for identifying the reference action-sequences and the difficulty-level data items; an information input interface into which a person inputs information from outside of the game terminal; a reference action-sequence selector for selecting one from among the plurality of reference action-sequences on the basis of the information input into the information input interface; a play processor for using the action-sequence data element describing the selected reference action-sequence to execute a process for realizing a play of a computer game, the play depending on the selected reference action-sequence; a play evaluator for evaluating each play of the computer game and giving a better evaluation to a player when a conformity of actions of the player, in a play period, to the reference action-sequence, is greater; an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-terminal memory unit; an energy-consumption data item generator for generating a data item describing a value corresponding to the estimated energy consumption for the at least one reference action-sequence; and a difficulty-level data writer for writing, into the in-terminal memory unit, the data item describing the value corresponding to the estimated energy consumption as the difficulty-level data item describing the difficulty level of the reference action-sequence.

This game terminal sets the difficulty level of at least one reference action-sequence, using the action-sequence data element describing the at least one reference action-sequence, and does not need assessments of the reference action-sequence by players for setting the difficulty level. Accordingly, the game terminal can set an objective difficulty level of at least one reference action-sequence with a reduced workload for a computer game.

The game terminal may further include a reader for reading data from a portable storage medium that is computer-readable; and a reference-action-sequence data writer for writing, into the in-terminal memory unit, the read data as a new action-sequence data element describing a new reference action-sequence. Since the game terminal can carry out a play depending on the reference action-sequence described by the action-sequence data element recorded in a storage medium, users of the game terminal can become players who perform a play depending on the reference action-sequence by preparing such a storage medium into which the action-sequence data element describing the reference action-sequence made by the user is recorded. In addition, in the game terminal, since a new action-sequence data element read from a storage medium by the reader is written into the in-terminal memory unit, users of the game terminal can become players who perform plays depending on the reference action-sequence made by another person. Furthermore, in this game terminal, the difficulty level of a new reference action-sequence made by a user of the game terminal is set on the basis of the action-sequence data element describing the reference action-sequence, so that the difficulty level of the reference action-sequence is more objective than that determined on the basis of a report by the preparer of the reference action-sequence.

In the game terminal, the play evaluator may give a better evaluation to a player when the difficulty level of the reference action-sequence selected by the player is greater in each play of the computer game. The game terminal may further include a manipulation interface manipulated by a person and an action determiner for determining actions of a player for a play period of each play of the computer game on the basis of manipulations of the manipulation interface. In an alternative embodiment, the game terminal may include a sensor for detecting actions of a human, and another action determiner for determining actions of a player for a play period of each play of the computer game on the basis of measurement results of the sensor in the play period.

In addition, the present invention provides a play-difficulty-level setting apparatus including: an in-apparatus memory unit for storing at least one action-sequence data element describing at least one reference action-sequence that is the same as an action-sequence data element used in a game terminal of a computer game; an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-apparatus memory unit; an energy-consumption data item generator for generating a data item describing a value corresponding to the estimated energy consumption for the at least one reference action-sequence; and a difficulty-level data outputter for outputting, to the outside the play-difficulty-level setting apparatus, the data item describing the value corresponding to the estimated energy consumption as the difficulty-level data item describing the difficulty level of the reference action-sequence.

The play-difficulty-level setting apparatus is different from a game terminal of the computer game, and it sets the difficulty level of at least one reference action-sequence, using the action-sequence data element describing the at least one reference action-sequence. Consequently, the play-difficulty-level setting apparatus does not need assessments of the reference action-sequence by players for setting the difficulty level. Accordingly, the play-difficulty-level setting apparatus can set an objective difficulty level of at least one reference action-sequence with a reduced workload for a computer game.

The play-difficulty-level setting apparatus may further include a reader for reading data from a portable storage medium that is computer-readable; and a reference-action-sequence data writer for writing, into the in-apparatus memory unit, the read data as a new action-sequence data element describing a new reference action-sequence. Users of the play-difficulty-level setting apparatus can cause the play-difficulty-level setting apparatus to set the difficulty level of a reference action-sequence by preparing a storage medium into which the action-sequence data element describing the reference action-sequence made by the user is recorded. In the play-difficulty-level setting apparatus, the difficulty level of a new reference action-sequence made by a user of the play-difficulty-level setting apparatus is set on the basis of the action-sequence data element describing the reference action-sequence, so that the difficulty level of the reference action-sequence is more objective than that determined on the basis of a report by the preparer of the reference action-sequence.

In addition, the present invention provides a computer program used in a game terminal including: an in-terminal memory unit for storing, for each of a plurality of reference action-sequences, an action-sequence data element for describing a reference action-sequence, identifier for identifying the reference action-sequence, and a difficulty-level data item for describing a difficulty level of the reference action-sequence in such a manner that the action-sequence data element, the identifier, and the difficulty-level data item of a reference action-sequence are mutually associated; an information outputter for outputting, to the outside of the game terminal, for each of the plurality of reference action-sequences, a piece of information identifying a reference action-sequence and a piece of information describing the difficulty level of the reference action-sequence in such a manner that the pieces of information of the reference action-sequence are mutually associated on the basis of the identifiers for identifying the reference action-sequences and the difficulty-level data items; an information input interface into which a person inputs information from outside the game terminal; a reference action-sequence selector for selecting one from among the plurality of reference action-sequences on the basis of the information input into the information input interface; a play processor for using the action-sequence data element describing the selected reference action-sequence to execute a process for realizing a play of a computer game, the play depending on the selected reference action-sequence; and a play evaluator for evaluating each play of the computer game and giving a better evaluation to a player when a conformity of actions of the player for a play period to the reference action-sequence is greater, the computer program causing the game terminal to serve as: an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-terminal memory unit; an energy-consumption data item generator for generating a data item describing a value corresponding to the estimated energy consumption for the at least one reference action-sequence; and a difficulty-level data writer for writing, into the in-terminal memory unit, the data item describing the value corresponding to the estimated energy consumption as the difficulty-level data item describing the difficulty level of the reference action-sequence. The present invention also provides a computer-readable storage medium, in which the computer program is recorded.

The computer program enables the game terminal to set an objective difficulty level of at least one reference action-sequence with a reduced workload for a computer game that gives a better evaluation to a player when the conformity of actions of the player to a predetermined reference action-sequence is greater.

In addition, the present invention provides a computer program used in a play-difficulty-level setting apparatus which is different from a game terminal of a computer game, the computer program causing the play-difficulty-level setting apparatus to serve as: an in-apparatus memory unit for storing at least one action-sequence data element describing at least one reference action-sequence that is the same as an action-sequence data element used in the game terminal of the computer game; an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-apparatus memory unit; an energy-consumption data item generator for generating a data item describing a value corresponding to the estimated energy consumption for the at least one reference action-sequence; and a difficulty-level data outputter for outputting, to the outside of the play-difficulty-level setting apparatus, the data item describing the value corresponding to the estimated energy consumption as the difficulty-level data item describing the difficulty level of the reference action-sequence. The present invention also provides a computer-readable storage medium, in which the computer program is recorded.

The computer program enables the play-difficulty-level setting apparatus to set an objective difficulty level of at least one reference action-sequence with a reduced workload for a computer game that gives a better evaluation to a player when a conformity of actions of the player to a predetermined reference action-sequence is greater.

The present invention can be realized as a data carrier (e.g. network) for transmitting the computer program. That is, the present invention can be realized as a data carrier for computer-readably recording or transmitting the computer program. The present invention can also be realized as a computer program element that is a part or the entirety of the computer program. The present invention can also be realized as a computer program product including an information-recording medium that stores data that will be the computer program by loading into a computer.

BRIEF DESCRIPTION OF DRAWINGS

FIG. 2 is a diagram showing an image displayed on the screen of a display device of the game terminal in FIG. 1;
FIG. 3 is a diagram showing another image displayed on the screen of the display device of the game terminal in FIG. 1;
FIG. 8 is a flowchart showing a play process executed by the game terminal in FIG. 1;
FIG. 9 is a diagram showing an image displayed on the screen at a reference dance selection routine executed by the game terminal in FIG. 1.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within the scope thereof. Embodiments described below relate to a specific dance game. The specific dance game is a computer game that gives a better evaluation to a player when the conformity of actions of the player to a predetermined reference action-sequence is greater.

First Embodiment

Figure 1:
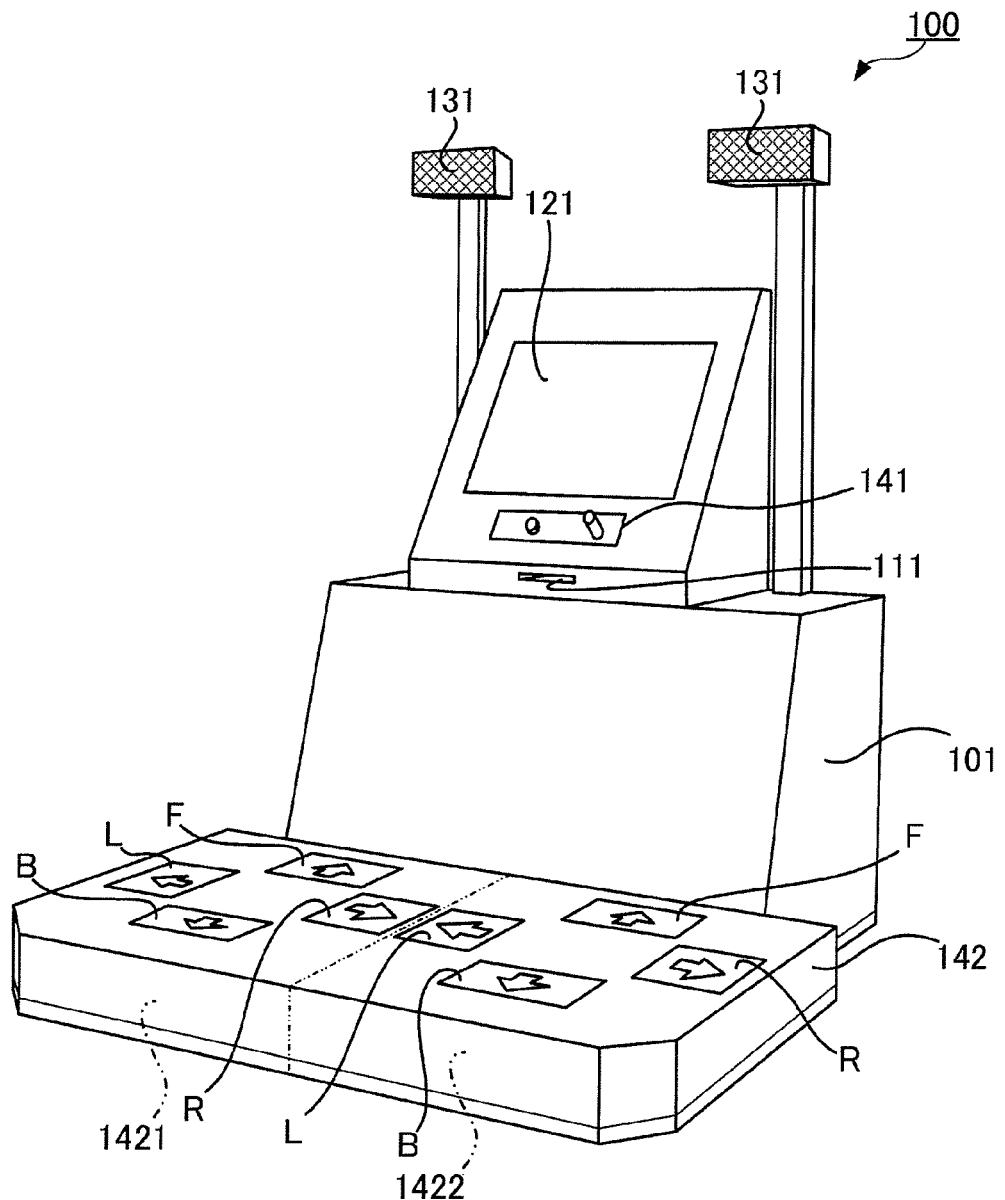
FIG. 1 is perspective view showing a game terminal according to a first embodiment of the present invention.

FIG. 1 is perspective view showing a game terminal 100 according to a first embodiment of the present invention. The game terminal 100 is a game terminal for the specific dance game and is located at a game place. The difficulty level of each of the reference dances (reference action-sequences, that is, reference step-sequences) can be set. The "difficulty level" of each reference dance is a degree of difficulty for players in stepping to conform to the reference dance. The game terminal 100 of the first embodiment may have a function for communicating with another apparatus, or may be a standalone terminal.

The game terminal 100 includes a main body 101 and a flat lower manipulation interface 142. The lower surface of the lower manipulation interface 142 is in contact with the floor in the game place. Players of the dance game can dance on the lower manipulation interface 142.

The lower manipulation interface 142 includes a first stage 1421 and a second stage 1422 that are flat. The first stage 1421 and second stage 1422 do not overlap with each other, and the upper surfaces thereof are flush and constitute an upper surface of the lower manipulation interface 142. A single player dances on the first stage 1421 in a single stage mode, whereas a single player dances on both of the first stage 1421 and the second stage 1422 in the double stage mode.

Each of the first stage 1421 and the second stage 1422 includes a front step panel F that is stomped on by a foot of the player of the dance game when the player steps forward from a home position, a back step panel B that is stomped on when the player steps backward, a left step panel L that is stomped on when the player steps leftward, and a right step panel R that is stomped on when the player steps rightward. On the upper surface of each of the first stage 1421 and the second stage 1422, the front step panel F, the back step panel B, the left step panel L, and the right step panel R are exposed.

The main body 101 is connected to an end of the lower manipulation interface 142. The main body 101 is provided with a screen 121 for displaying images, a pair of speakers 131 for outputting sound, an upper manipulation interface 141 including operated parts (for example, a lever and a button) operated by users of the game terminal 100, and a loading slot 111 into which a computer-readable storage medium is inserted. The upper manipulation interface 141 generates data in response to operations of the operated parts and supplies the data to a processor of the game terminal 100, and therefore the upper manipulation interface 141 serves as an information input interface into which a person inputs information from outside of the game terminal.

FIGS. 2 and 3 are diagrams showing images displayed in the screen 121. These images are displayed in the screen 121 in a play of the dance game. Directly after displaying the image of FIG. 2, the screen 121 displays the image of FIG. 3. As will be clearly understood from FIGS. 2 and 3, in a play of the dance game, the screen 121 shows step-panel-indication marks P1, P2, . . . travelling from the bottom to top and step-time indication marks T1 through T8 fixedly arranged at the top of the screen 121

The step-time indication marks T1, T2, T3, and T4 indicate time points at which the left step panel L, the back step panel B, the front step panel F, and the right step panel R on the first stage 1421 should be stomped on. The step-time indication marks T5, T6, T7, and T8 indicate time points at which the left step panel L, the back step panel B, the front step panel F, and the right step panel R on the second stage 1422 should be stomped on. Each of the step-panel-indication marks P1, P2, indicates one of the front step panel F, the back step panel B, the left step panel L, and the right step panel R which should be stomped on. However, the images shown in FIG. 2 and FIG. 3 are used when the operational mode (which will be described later) is a single stage mode. In a double stage mode, other step-panel-indication marks are additionally displayed for indicating to stomp step panels on the second stage 1422. At the top of the screen 121, the step-panel-indication marks overlap the step-time indication marks when the step panels indicated by the marks should be stomped on.

In a play of the dance game, a player standing on the lower manipulation interface 142 views a moving picture on the screen 121 and dances by stomping step panels indicated by the moving picture. Consequently, the player confronts the main body 101 in a play of the dance game. Therefore, on each of the first stage 1421 and the second stage 1422, the front step panel F is located near the main body 101, the back step panel B is located far from the main body 101, the left step panel L is located at the left side for the player confronting the main body 101, and the right step panel R is located at the right side for the player facing the main body 101.

Figure 4:
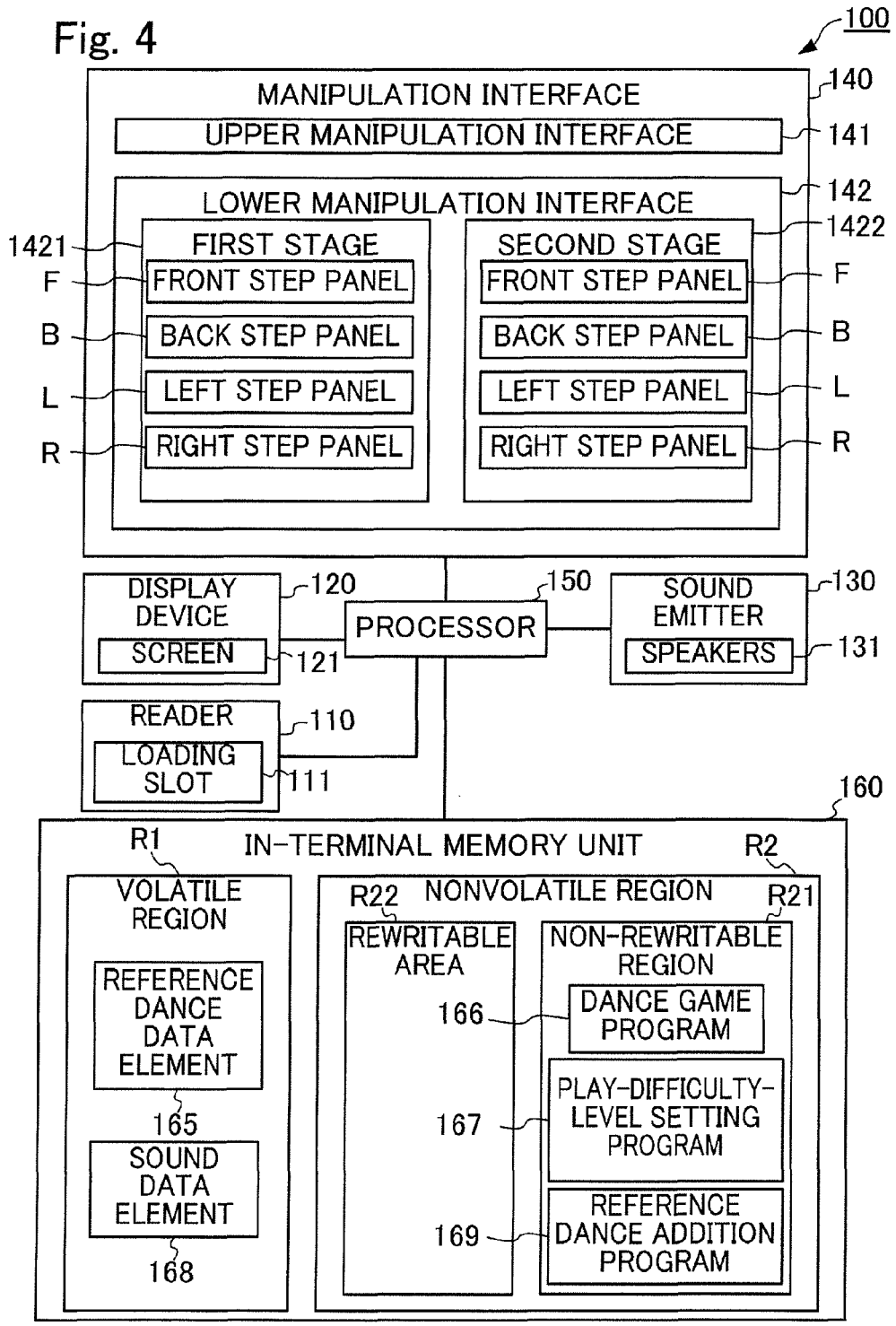
FIG. 4 is a block diagram showing a structure of the game terminal in FIG. 1.

FIG. 4 is a block diagram showing a structure of the game terminal 100. The game terminal 100 includes a processor 150 for processing various data; manipulation interface 140 operated by users and supplying operational data to the processor 150 in response to the user operation; a display device 120 for displaying images on the screen 121 using image data supplied from the processor 150; a sound emitter 130 for emitting from the speakers 131 sound based on sound data supplied from the processor 150; a reader 110 for reading data out of the storage medium inserted into the loading slot 111 and for supplying the data to the processor 150; and an in-terminal memory unit 160 for storing various data. The display device 120 may be, for example, a monitor or a video projector. For a video projector, a screen on which images are projected is used instead of the screen 121.

The manipulation interface 140 includes the aforementioned upper manipulation interface 141 and the aforementioned lower manipulation interface 142. The upper manipulation interface 141 supplies operational data to the processor 150 in response to the user operation to each operated part. Thus, the upper manipulation interface 141 serves as an information input interface into which a person inputs information from outside of the game terminal. The front step panel F on the first stage 1421 of the lower manipulation interface 142 includes a switch (for example, a cable switch) that alters its on/off state depending on the load applied, so that when the front step panel F is stomped on, the front step panel F supplies operational data indicating the address of the front step panel F to the processor 150. The same is true for other step panels on the first stage 1421. The same is also true for the front step panel F, the back step panel B, the left step panel L, and the right step panel R on the second stage 1422. Thus, the first stage 1421 and the second stage 1422 serve as manipulation interfaces for supplying to the processor 150 operational data depending on the operation by a person to each operated part. Of course, the lower manipulation interface 142 also serves as a manipulation interface for supplying to the processor 150 operational data depending on the operation by a person to each operated part.

The storage area of the in-terminal memory unit 160 is classified as a volatile region R1 that requires a power source for storing its contents and a nonvolatile region R2 that does not require a power source for storing its contents. The nonvolatile region R2 is classified as a non-rewritable region R21 in which the contents are not rewritable and a rewritable area R22 in which the contents are rewritable. The volatile region R1 is constituted of for example, a RAM (Random Access Memory), whereas the non-rewritable area R21 is constituted of for example, a ROM (Read Only Memory), and the rewritable area R22 is constituted of, for example, a hard disk.

In a play of the dance game, a player steps to conform to a reference dance selected by the player from among a plurality of reference dances prepared beforehand. For this purpose, into the volatile region R1, a reference dance data element 165 describing a reference dance for the current or next play and a sound data element 168 for reproducing a musical sound corresponding to the reference dance are written. The non-rewritable area R21 stores a dance game program 166, a play-difficulty-level setting program 167, and a reference dance addition program 169 all of which will be executed by the processor 150. The dance game program 166 is a computer program for causing the processor 150 of the game terminal 100 to execute a play process, which will be described later. The play-difficulty-level setting program 167 is a computer program for causing the processor 150 of the game terminal 100 to execute a play-difficulty-level setting process, which will be described later. The reference dance addition program 169 is a computer program for causing the processor 150 of the game terminal 100 to execute a reference dance addition process, which will be described later.

Figure 5:
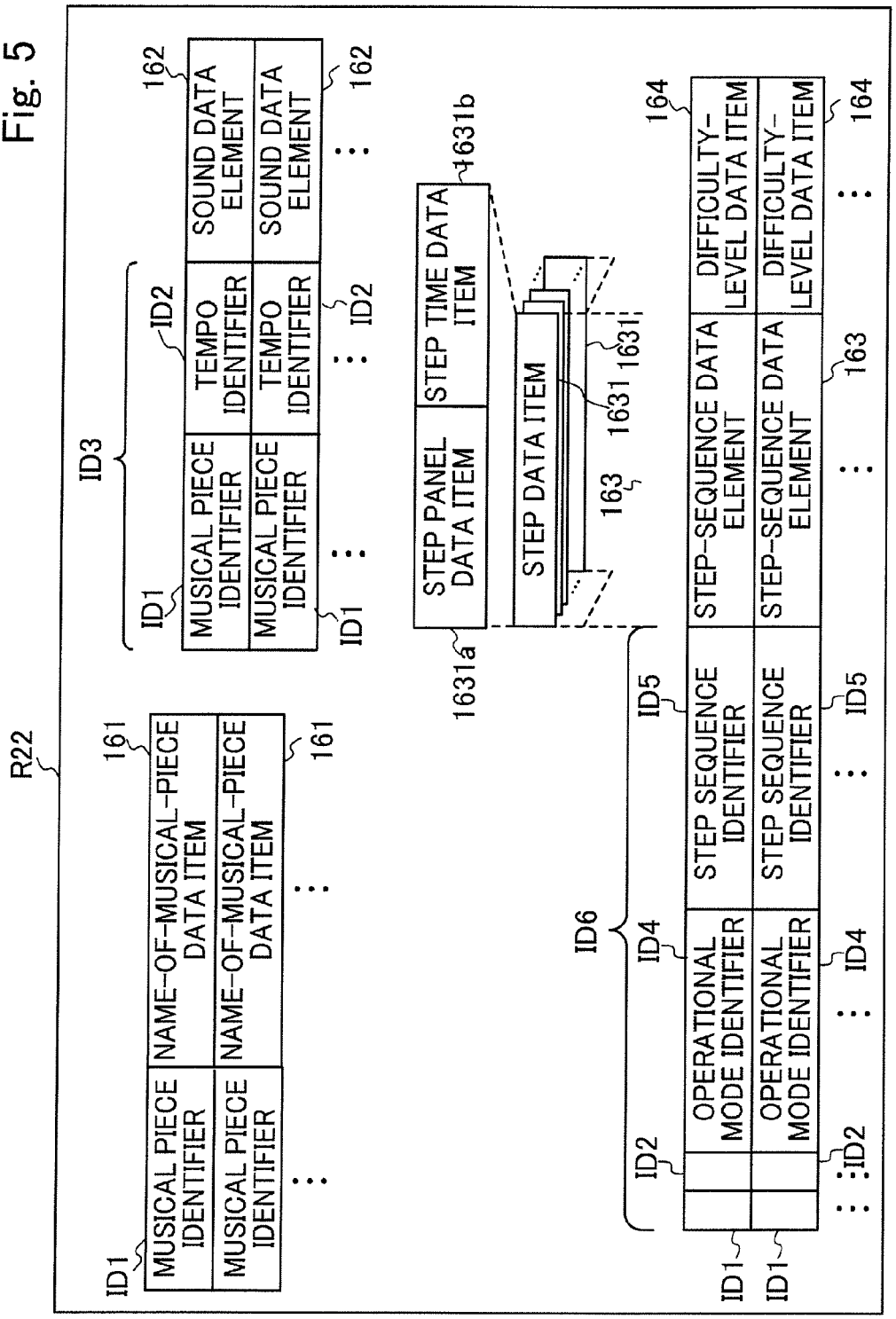
FIG. 5 is a schematic view showing data stored in a rewritable area of a memory unit of the game terminal in FIG. 1.

FIG. 5 is a schematic view showing data stored in the rewritable area R22. The rewritable area R22 stores a plurality of name-of-musical-piece data items 161, each of which identifies a name of a musical piece and is associated with a musical piece identifier ID1 that identifies the musical piece among a plurality of musical pieces prepared in advance. The rewritable area R22 also stores a plurality of sound data elements 162, each of which is used for reproducing a musical sound and is associated with a musical sound identifier ID3 that identifies the musical sound among a plurality of musical sounds prepared in advance. Each musical sound identifier ID3 is a set of a musical piece identifier ID1 and a tempo identifier ID2. The tempo identifier ID2 identifies a tempo among a plurality of tempos prepared in advance.

The sound data element 162 may be generated by sampling or by other suitable process. In a modification of this embodiment, different musical pieces having the same melody, but with different tempos, may be reproduced by transforming sound data element 162 appropriately. In this case, the number of sound data elements 162 may be reduced to the number of the melodies.

The rewritable area R22 of the in-terminal memory unit 160 stores a plurality of step-sequence data elements 163 (action-sequence data elements) describing a plurality of reference dances (reference action-sequences, that is, reference step-sequences) prepared in advance, reference dance identifiers ID6 identifying the reference dances, and difficulty-level data items 164 indicating the difficulty levels of the reference dances in such a manner that a step-sequence data element 163 is associated with the corresponding reference dance identifier ID6 and the corresponding difficulty-level data item 164.

Each reference dance identifier ID6 is a set of a musical piece identifier ID1, a tempo identifier ID2, an operational mode identifier ID4, and a step sequence identifier ID5. The operational mode identifier ID4 identifies the number of operational modes (the single stage mode or the double stage mode) prepared in advance. In a play in the single stage mode, a player uses the first stage 1421 among the first stage 1421 and the second stage 1422. Thus, in a play in the single stage mode, the player uses the central portion of the first stage 1421 as the home position for dancing. In a play in the double stage mode, two players use the first stage 1421 and the second stage 1422. Thus, in a play in the double stage mode, the player uses the boundary between the first stage 1421 and the second stage 1422 as the home position for dancing.

Plural reference dances are prepared even for the same musical sound, the same tempo, and the same operational mode. The step sequence identifier ID5 in the reference dance identifier ID6 identifies a reference dance among a plurality of reference dances specified by the musical piece identifier ID1, the tempo identifier ID2, and the operational mode identifier ID4.

The step-sequence data element 163 describes a step sequence that is a series of footsteps, and this includes a plurality of step data items 1631. Each step data item 1631 describes details of a foot step, and includes a step panel data item 1631*a* indicating the address of the step panel to be stomped on at the foot stomp and a step time data item 1631*b* indicating the time point at which the step panel is stomped on at the footstep.

Once a reference dance to be played next is selected, the step-sequence data element 163 corresponding to the reference dance is retrieved from the rewritable area R22, and this is written into the volatile region R1 as the reference dance data element 165. In addition, the sound data element 162 for reproducing a musical sound corresponding to the reference dance is retrieved from the rewritable area R22, and is written into the volatile region R1 as the sound data element 168.

Architectures of data concerning reference dances stored in the rewritable area R22 of the in-terminal memory unit 160 of the game terminal 100 have been described with reference to FIG. 5. Architectures of data that are materials of the data concerning the reference dances may be those shown in FIG. 6. It is possible to transform a beat-position-step-sequence data element in the data of which the architecture is shown in FIG. 6 into a step-sequence data element shown in FIG. 7, and to write the step-sequence data element into the rewritable area R22 as the step-sequence data elements 163 shown in FIG. 5.

Figure 6:
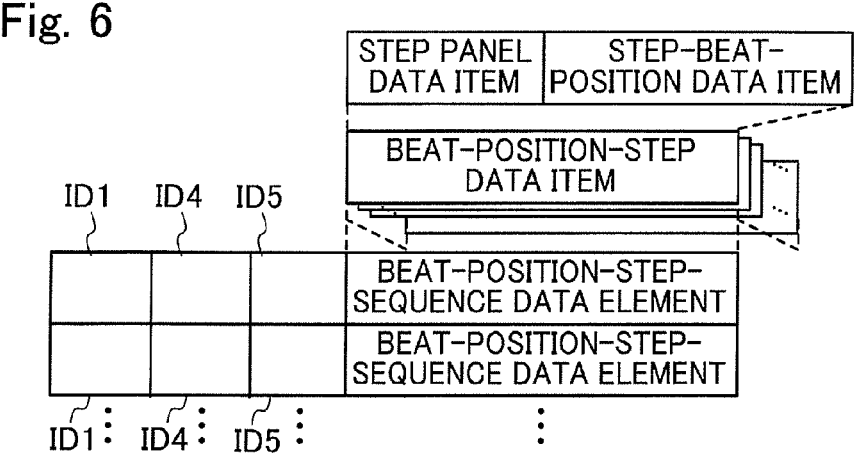
FIG. 6 is a schematic view showing an architecture of data stored in the memory unit that are materials of data concerning reference dances according to a modification of the first embodiment of the present invention.

FIG. 6 is a schematic view showing an architecture of data stored in the rewritable area R22 of the in-terminal memory unit 160 of the game terminal; the stored data are materials of data concerning reference dances according to a modification of the first embodiment of the present invention. In this modification, a beat-position-step-sequence data element is associated with a set of a musical piece identifier ID1, an operational mode identifier ID4, and a step sequence identifier ID5. Each beat-position-step-sequence data element includes a plurality of beat-position-step data items, each of which includes a step panel data item and a step-beat-position data item. The step panel data item is similar to the step panel data item 1631*a*, whereas the step-beat-position data item indicates a beat position in a musical sound, rather than a time point.

Figure 7:
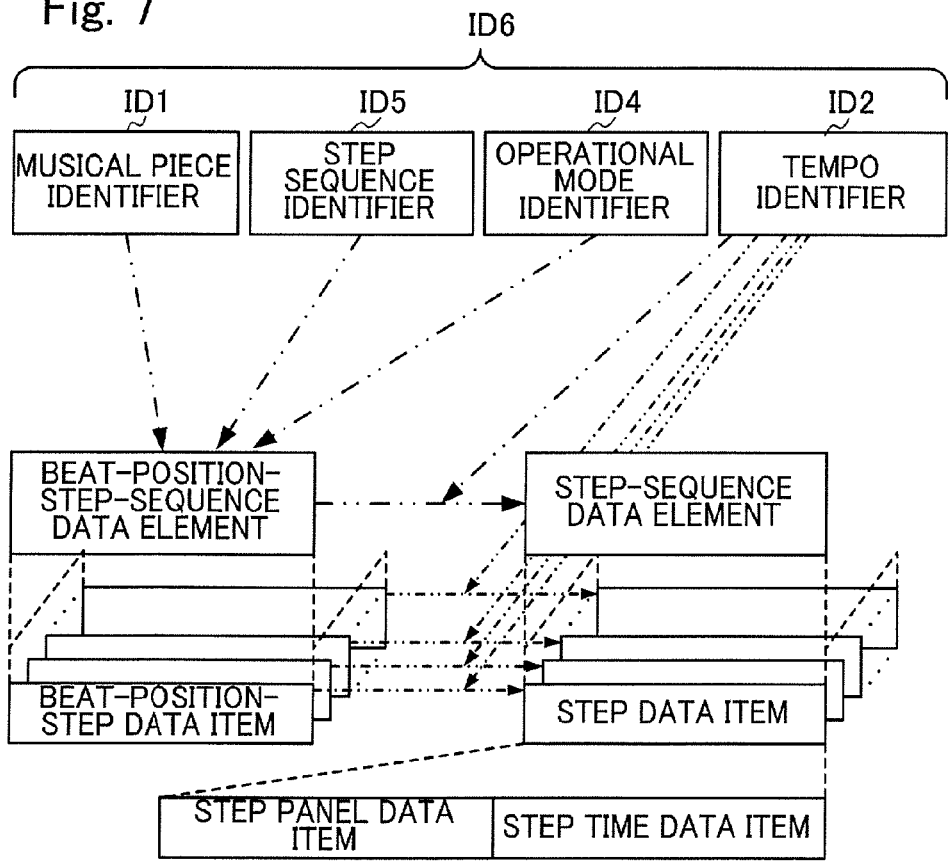
FIG. 7 is a schematic diagram showing a procedure for generating a step-sequence data element in the game terminal according to the modification.

FIG. 7 is a schematic diagram showing a procedure for generating a step-sequence data element in the game terminal according to the modification. A step-sequence data element 163 can be produced by transforming a beat-position-step-sequence data element depending on the tempo identified by the tempo identifier ID2 that is applied (and thus, transforming beat positions into time points). The reference dance identifier ID6 can be formed of the musical piece identifier ID1, the operational mode identifier ID4, and the step sequence identifier ID5 that are accompanied with the beat-position-step-sequence data element; and a tempo identifier ID2 applied.

FIG. 8 is a flowchart showing a play process executed by the game terminal 100. In the play process, the game terminal 100 first conducts a reference dance selection routine (step SA1) for enabling a reference dance for the next play to be selected. At the reference dance selection routine, the processor 150 produces image data that indicates an image of a list representing difficulty levels of a plurality of reference dances prepared beforehand and an image of a reverse video bar which points to a reference dance provisionally selected and overlaps the list. The processor 150 supplies the image data to the display device 120, so that the display device 120 displays the images on the basis of the image data.

FIG. 9 is a diagram showing an image displayed on the screen 121 at the reference dance selection routine. In FIG. 9, a reverse video bar G2 points to a reference dance that has been provisionally selected, whereas an image G1 is an image of the list representing difficulty levels of a plurality of reference dances prepared in advance. The image G1 contains a plurality of sectional images connected to one other, the sectional images showing the plurality of reference dances prepared in advance, respectively. The processor 150 produces image data indicating each sectional image on the basis of the reference dance identifier ID6 and the difficulty-level data item 164 for the corresponding reference dance. In each sectional image, a piece of information for identifying the reference dance (for example, "AAAAA, 150, single, 1") is associated with (is adjacent to) a piece of information for indicating the difficulty level of the reference dance (for example, "1"). Thus, the processor 150 and the display device 120 serve as an information outputter for outputting, to the outside of the game terminal, a piece of information identifying a reference dance and a piece of information describing the difficulty level of the reference dance in such a manner that the pieces of information of the reference dance are mutually associated on the basis of the reference dance identifier ID6 and the difficulty-level data item 164 of the reference dance.

The reference dance initially provisionally selected (highlighted by the reverse video bar G2) is predetermined. The processor 150 changes the provisionally selected reference dance in accordance with operational data supplied from the upper manipulation interface 141 in response to the player's manipulation. The part of the image G1 initially displayed on the screen 121 is also predetermined. The processor 150 changes the displayed part on the screen 121 in accordance with operational data supplied from the upper manipulation interface 141 in response to the player's manipulation. In other words, the image G1 is scrolled.

Once particular operational data is supplied from the upper manipulation interface 141 (information input interface) at the reference dance selection routine, the processor 150 serves as a reference action-sequence selector for selecting the currently provisionally selected reference dance (highlighted by the reverse video bar G2). More specifically, the processor 150 writes the step-sequence data element 163 corresponding to the currently provisionally selected reference dance into the volatile region R1 as the reference dance data element 165. At this stage, the processor 150 also selects the musical sound corresponding to the currently provisionally selected reference dance, and writes the sound data element 162 into the volatile region R1 as the sound data element 168.

At step SA2, the processor 150 of the game terminal 100 serves as a play processor for executing a play execution routine in which the player can perform a play of the dance game. More specifically, the game terminal 100 parallelly executes a foot step instruction routine SA21 for instructing foot steps of the selected reference dance, a sound reproduction routine SA22 for reproducing the selected musical sound, and a conformity calculation routine SA23 for calculating the conformity of actions by the player for a play period to the selected reference dance. The play period of the performed play is defined between the start and end of the play execution routine.

At the sound reproduction routine SA22, the processor 150 uses the sound data element 168 and supplies sound data indicating the selected musical sound to the sound emitter 130. As a result, the speakers 131 output the selected musical sound.

At the footstep instruction routine SA21, using the reference dance data element 165, the processor 150 sequentially supplies image data that instructs each footstep of the selected reference dance to the display device 120. As a result, the display device 120 shows a moving picture instructing each of the footsteps of the selected reference dance (see FIGS. 2 and 3). The player will act in accordance with the instructions presented by the moving picture on the screen 121. More specifically, the player should stomp on a step panel when a step-panel-indication mark corresponding to the step panel overlaps the step-time indication mark corresponding to the step panel in the screen 121.

At the conformity calculation routine SA23, using operational data supplied from the lower manipulation interface 142 for the play period, the processor 150 specifies the player's actions for the play period. The processor 150 also calculates the conformity on the basis of the player's actions and the reference dance data element 165. Thus, the processor 150 of the game terminal 100 serves as an action determiner for determining the player's actions for the play period of each play on the basis of manipulations of the manipulation interface.

Next, the game terminal 100 determines the result of the play that has ended, and conducts a result outputting routine for outputting the result at step SA3. More specifically, the processor 150 serves as a play evaluator for determining the result of the play that has ended on the basis of the conformity calculated for the play and the difficulty level of the selected reference dance, and supplies image data indicating the result to the display device 120. The greater the conformity, the better the result. In addition, the greater the difficulty level of the selected reference dance, the better the result. After step SA3, the process returns to step SA1.

Figure 10:
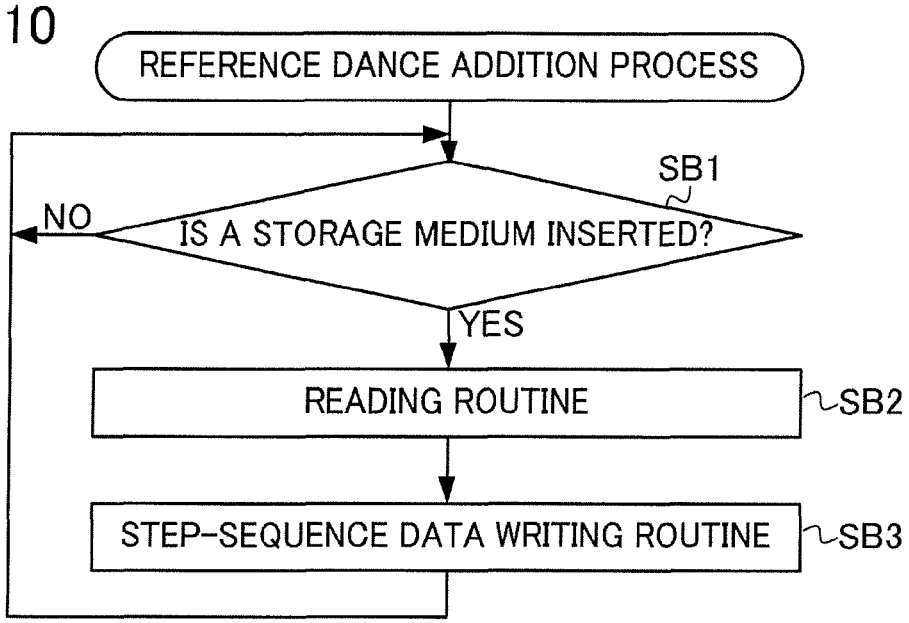
FIG. 10 is a flowchart showing a reference dance addition process executed by the game terminal in FIG. 1.

FIG. 10 is a flowchart showing a reference dance addition process executed by the game terminal. The game terminal 100 is designed such that a user can add a reference dance after production thereof. The process for adding a reference dance after production of the game terminal 100 is the reference dance addition process. In the reference dance addition process, the game terminal 100 first determines whether or not a computer-readable portable storage medium, in which a step-sequence data element and a step sequence identifier for the step-sequence data element are recorded, is inserted into the loading slot 111 (step SB1). This determination is conducted by cooperation of the reader 110 and the processor 150. If the determination is negative, the process returns to step SB1.

If the determination at step SB1 is affirmative, the game terminal 100 conducts a reading routine (step SB2). More specifically, the reader 110 reads a step-sequence data element and a reference dance identifier corresponding to a reference dance from the storage medium in the loading slot 111, and it supplies the step-sequence data element and the reference dance identifier to the processor 150. Then, the game terminal 100 conducts a step-sequence data writing routine (step SB3). More specifically, the processor 150 writes the step-sequence data element and the reference dance identifier read by the reader 110 in to the rewritable area R22 as a new step-sequence data element 163 and a new reference dance identifier ID6. Afterward, the process returns to step SB1.

It is possible to record the data of which the architecture is shown in FIG. 6 in the storage medium. In this case, once the storage medium is inserted (step SB1), the reader 110 reads the musical piece identifier ID1, the operational mode identifier ID4, the step sequence identifier ID5, and the beat-position-step-sequence data element that are related to a reference dance (step SB2). Next, as described in conjunction with FIG. 7, the processor 150 transforms the beat-position-step-sequence data element into a step-sequence data element and produces a reference dance identifier ID6. Then, the processor 150 serves as a reference-action-sequence data writer for writing the step-sequence data element and the reference dance identifier into the rewritable area R22 as a new step-sequence data element 163 and a new reference dance identifier ID6 (step SB3).

Figure 11:
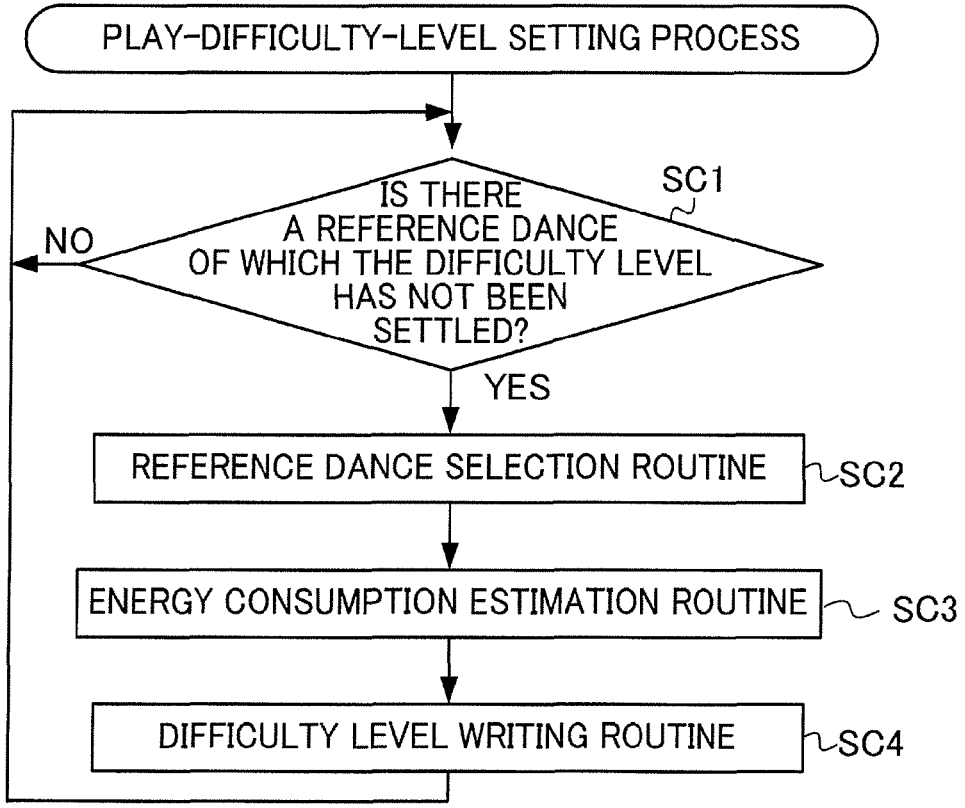
FIG. 11 is a flowchart showing a play-difficulty-level setting process executed by the game terminal in FIG. 1.

FIG. 11 is a flowchart showing the aforementioned play-difficulty-level setting process executed by the game terminal 100. In the play-difficulty-level setting process, game terminal 100 first determines whether or not there is a reference dance of which the difficulty level has not been settled (step SC1). This determination is realized by the processor 150 referring to the rewritable area R22 and determining whether or not in the rewritable area R22 there are step-sequence data elements 163 with which difficulty-level data item 164 is not associated. If the determination is negative, the process returns to step SC1. In this embodiment, at the initial stage, difficulty levels for all reference dances are not settled. Thus, there must be opportunities at which the determination at step SC1 is affirmative. Additionally, in this embodiment, the reference dance addition process enables a reference dance to be added to the game terminal 100, and whenever a reference dance is added, the determination at step SC1 becomes affirmative.

If the determination at step SC1 is affirmative, the processor 150 conducts a reference dance selection routine for selecting a reference dance of which the difficulty level has not been determined (step SC2). Next, the processor 150 serves as an energy-consumption estimator for conducting an energy consumption estimation routine for the selected reference dance (step SC3). More specifically, the energy-consumption estimator estimates energy consumption (Calories) of a hypothetical player, assuming that the hypothetical player's actions conform with the selected reference dance a play period of a play of the dance game using the selected reference dance, using an algorithm on the basis of the step-sequence data element 163 describing the reference dance and a statistic of energy consumption needed for each footstep.

The algorithm for estimating energy consumption may be selected freely or may be produced appropriately on the basis of experiments. Such experiments may include an experiment in which a plurality of human subjects perform a footstep action by stomping on step panels having an address indicated by each of a plurality of reference step panel data items, the actual energy consumed by each human subject is estimated on the basis of the measurement of the measuring instrument attached to the human subject, the energy consumption for the footstep is obtained by averaging the actual energy values for the plurality of human subjects.

If this experiment is conducted, for example, the algorithm may estimate the total energy consumption of the hypothetical player by summing all energy consumption values involved in all footsteps indicated by step panel data items 1631a included in the step-sequence data element 163 of the selected reference dance. For this purpose, data of energy consumption values involved in footsteps corresponding to a plurality of reference step panel data items may be stored in the rewritable area R22 or the non-rewritable area R21, or may be included in the play-difficulty-level setting program 167.

However, even for the same step panel data item 1631a, player's energy consumption may vary depending on the stepping speed (i.e., time required for stepping). In addition, even for the same step panel data item 1631a, player's energy consumption may vary depending on the operational mode and the home position corresponding to the operational mode. Accordingly, the algorithm for estimating energy consumption may preferably use the step time data items 1631b and the operational mode identifier ID4 in addition to the step panel data items 1631a. After step SC3, the processor 150 conducts a difficulty level writing routine for establishing the difficulty level of the selected reference dance (step SC4). More specifically, the processor 150 serves as an energy-consumption data item generator for generating a data item indicating a value corresponding to the energy consumption estimated at step SC3. Furthermore, the processor 150 writes the data item as the difficulty-level data item 164 indicating the difficulty level of the selected reference dance into the rewritable area R22. Afterward, the process returns to step SC1. Consequently, until there becomes no reference dance of which the difficulty level has not been determined, the routines from step SC1 through step SC4 are repeated. Thus, the game terminal 100 determines the difficulty level of a reference dance.

As described above, the processor 150 of the game terminal 100 estimates energy consumption of a hypothetical player, assuming that the hypothetical player performs at least one of the plurality of reference dances for a play period, on the basis of the step-sequence data element 163 describing the at least one reference dance stored in the in-terminal memory unit 160; generates a data item describing a value corresponding to the estimated energy consumption for the at least one reference dance; and writes, into the in-terminal memory unit 160, the data item describing the value corresponding to the estimated energy consumption as the difficulty-level data item 164 describing the difficulty level of the reference dance. Since the game terminal 100 establishes the difficulty level of the reference dance using the step-sequence data element describing the at least one reference dance, assessments of the reference dance by players are not needed for establishing the difficulty level of the reference dance. Accordingly, the game terminal 100 can set an objective difficulty level of at least one reference dance with a reduced workload for the dance game.

In addition, since the game terminal 100 enables a play in accordance with the reference dance described by the step-sequence data element recorded in a computer-readable storage medium, users of the game terminal can become players who play depending on the reference dance by preparing such a storage medium into which the step-sequence data element describing the reference dance made by the user is recorded. In addition, in the game terminal 100, since a step-sequence data element read from a storage medium by the reader is written into the rewritable area R22, users of the game terminal can become players who play depending on the reference dance made by another person. Furthermore, in this game terminal 100, the difficulty level of a new reference dance made by a user of the game terminal is set on the basis of the step-sequence data element 163 describing the reference dance, so that the difficulty level of the reference dance is more objective than that determined on the basis of a report by the preparer of the reference dance.

Second Embodiment

Figure 12:
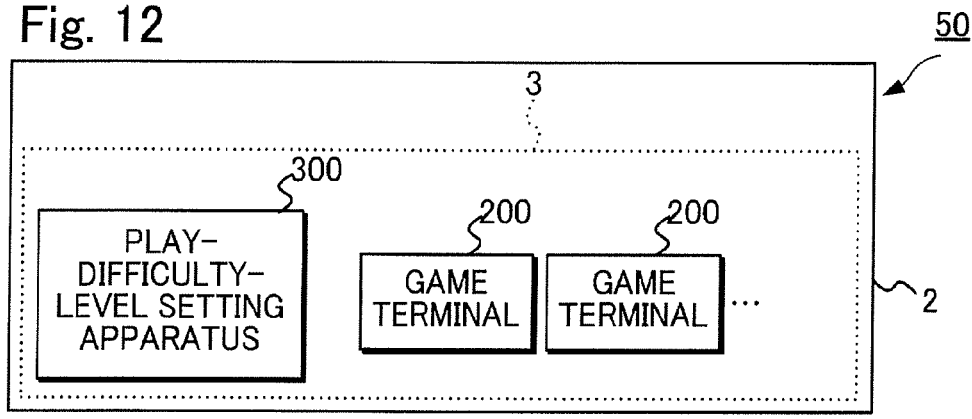
FIG. 12 is a block diagram showing a structure of a game system according to a second embodiment of the present invention.

FIG. 12 is a block diagram showing a structure of a game system 50 according to a second embodiment of the present invention. The game system 50 is located in a game place 2 and includes a plurality of game terminals 200, 200, . . . each of which is a terminal node belonging to a LAN (Local Area Network) 3 provided at the game place 2 (in this embodiment, a game arcade) visited by many unspecified people; and a play-difficulty-level setting apparatus 300 which is another terminal node belonging to the LAN 3.

Figure 13:
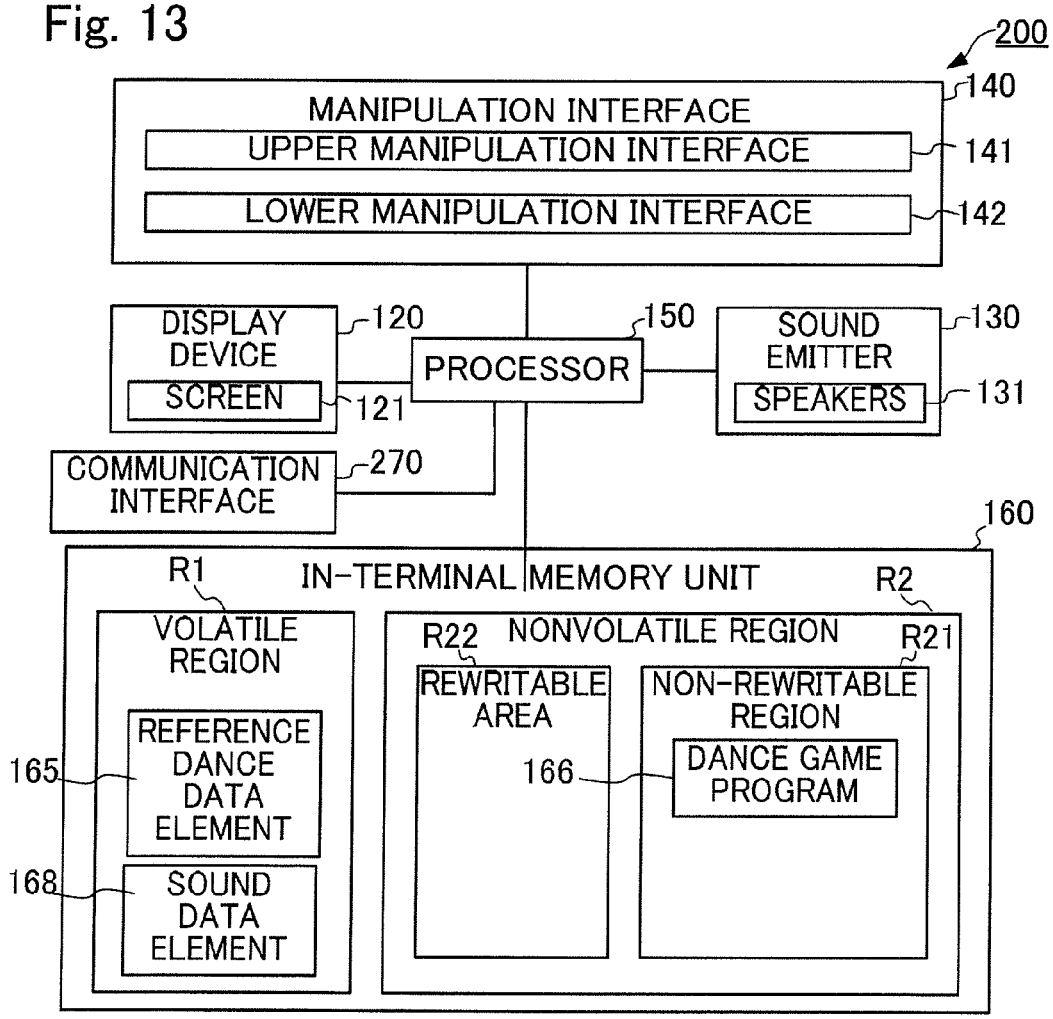
FIG. 13 is a block diagram showing a structure of a game terminal in the game system in FIG. 12.

FIG. 13 is a block diagram showing a structure of the game terminal 200. The game terminal 200 is a game terminal for providing the dance game, so that it has a structure similar to that of the game terminal 100. However, in the game system 50, the play-difficulty-level setting apparatus 300 sets the difficulty level of a reference dance, and adds a reference dance. Accordingly, the game terminal 200 does not include the reader 110, and the non-rewritable region R21 of the in-terminal memory unit 160 of the game terminal 200 does not store the play-difficulty-level setting program 167 or the reference dance addition program 169. The game terminal 200 includes a communication interface 270 for transmitting and receiving data under control of the processor 150.

As is clear from the above description, the game terminal 200 executes the play process described above in conjunction with FIG. 8 for the same game as in the first embodiment.

Figure 14:
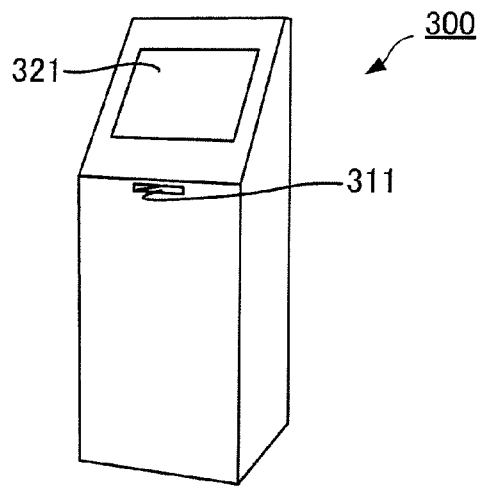
FIG. 14 is a perspective view showing a play-difficulty-level setting apparatus in the game system in FIG. 12.

FIG. 14 is a perspective view showing the play-difficulty-level setting apparatus 300. The play-difficulty-level setting apparatus 300 is a computer for establishing the difficulty level of a reference dance for the dance game. The housing of the play-difficulty-level setting apparatus 300 is provided with a screen 321 for displaying images, and a loading slot 311 into which a computer-readable storage medium is inserted.

Figure 15:
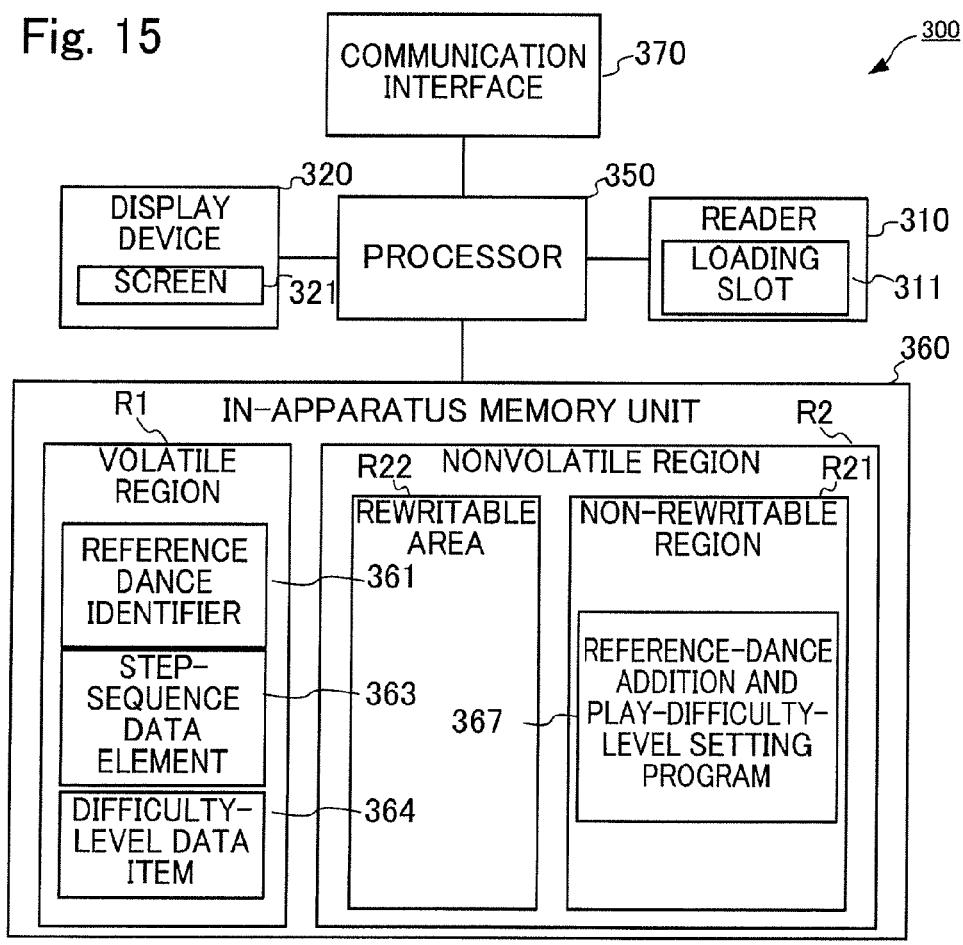
FIG. 15 is a block diagram showing a structure of the play-difficulty-level setting apparatus in FIG. 14.

FIG. 15 is a block diagram showing a structure of the play-difficulty-level setting apparatus 300. The play-difficulty-level setting apparatus 300 includes a processor 350 for processing various data; a display device 320 for displaying images on the screen 321 using image data supplied from the processor 350; a reader 310 for reading data out of the storage medium inserted into the loading slot 311 and for supplying the data to the processor 350; and an in-apparatus memory unit 360 for storing various data. The display device 320, the reader 310, and the in-apparatus memory unit 360 have the same structures as those of the display device 120, the reader 110, and the in-terminal memory unit 160 in FIG. 4, respectively. The play-difficulty-level setting apparatus 300 also includes a communication interface 370 for transmitting and receiving data under control of the processor 350.

Into the volatile region R1 of the in-apparatus memory unit 360, a reference dance identifier 361, a step-sequence data element 363 (action-sequence data element), and a difficulty-level data item 364 are written for a reference dance (reference action-sequence, that is, a reference step-sequence). The non-rewritable region R21 of the in-apparatus memory unit 360 stores a reference-dance addition and play-difficulty-level setting program 367 executed by the processor 350. The reference-dance addition and play-difficulty-level program 367 is a computer program for causing the processor 350 of the game terminal 300 to execute a reference-dance addition and play-difficulty-level setting process, which will be described later.

Figure 16:
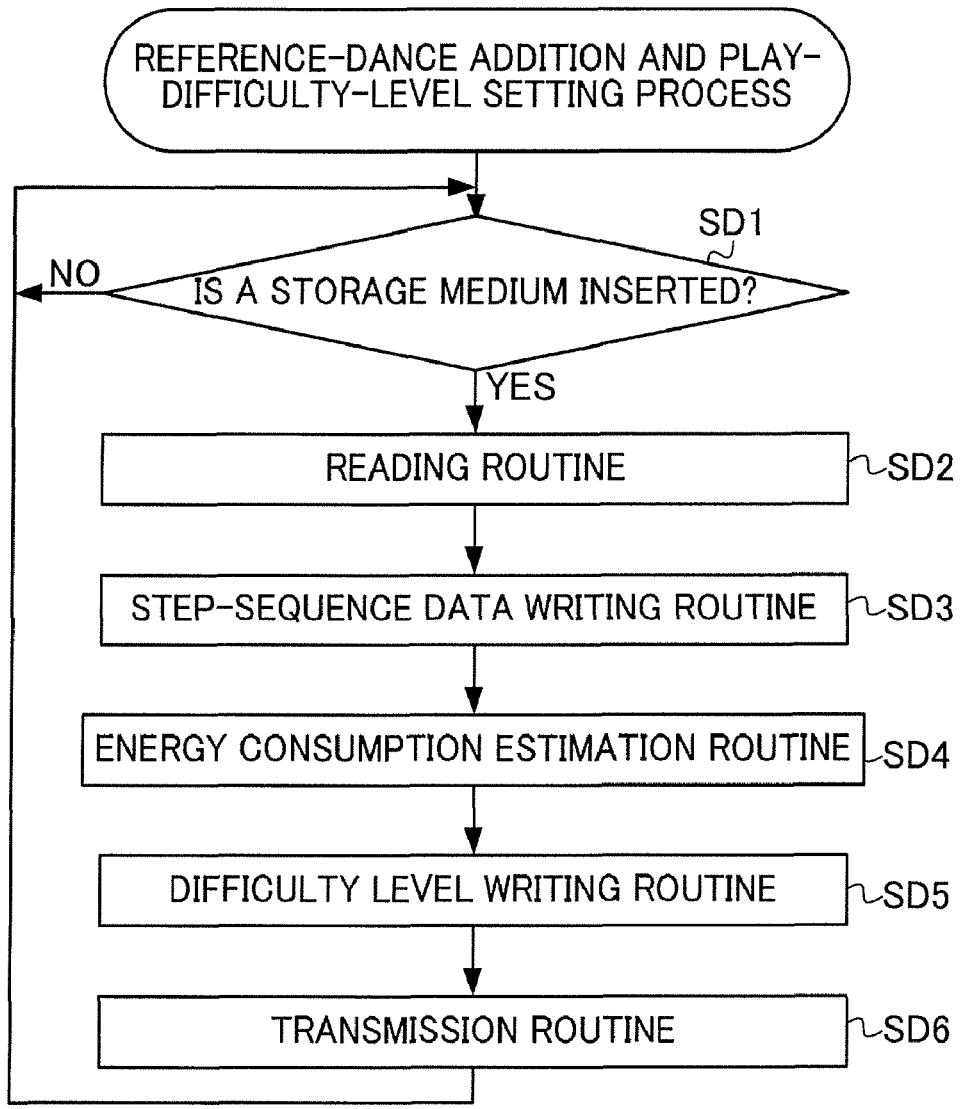
FIG. 16 is a flowchart showing a reference-dance addition and play-difficulty-level setting process executed by the play-difficulty-level setting apparatus in FIG. 14.

FIG. 16 is a flowchart showing the reference-dance addition and play-difficulty-level setting process executed by the play-difficulty-level setting apparatus 300. In the reference-dance addition and play-difficulty-level setting process, the play-difficulty-level setting apparatus 300 first determines whether or not a computer-readable portable storage medium, in which a step-sequence data element and a step sequence identifier for the step-sequence data element are recorded, is inserted into the loading slot 311 (step SD1). This determination is conducted by cooperation of the reader 310 and the processor 350. If the determination is negative, the process returns to step SD1.

If the determination at step SD1 is affirmative, the play-difficulty-level setting apparatus 300 conducts a reading routine (step SD2). More specifically, the reader 310 reads a step-sequence data element and a reference dance identifier corresponding to a reference dance from the storage medium in the loading slot 311, and supplies the step-sequence data element and the reference dance identifier to the processor 350. Then, the processor 350 serves as a reference-action-sequence data writer for conducting a step-sequence data writing routine (step SD3) in which the reference-action-sequence data writer writes the step-sequence data element and the reference dance identifier read by the reader 310 into the volatile region R1 of the in-apparatus memory unit 360 as a new step-sequence data element 363 and a new reference dance identifier 361. Thus, a new reference dance is added in the play-difficulty-level setting apparatus 300.

It is possible to record the data of which the architecture is shown in FIG. 6 in the storage medium. In this case, once the storage medium is inserted (step SD1), the reader 310 reads the musical piece identifier ID1, the operational mode identifier ID4, the step sequence identifier ID5, and the beat-position-step-sequence data element that are related to a reference dance (step SD2). Next, as described in conjunction with FIG. 7, the processor 350 transforms the beat-position-step-sequence data element into a step-sequence data element and produces a reference dance identifier ID6. Then, the processor 350 serves as a reference-action-sequence data writer for writing the step-sequence data element and the reference dance identifier into the rewritable area R22 as a new step-sequence data element 363 and a new reference dance identifier 361 (step SD3).

Next, the processor 350 serves as an energy-consumption estimator for conducting an energy consumption estimation routine for the reference dance (step SD4). Details of the energy consumption estimation routine are similar to those of the energy consumption estimation routine (step SC3) in FIG. 11, except that the step-sequence data element 363 is subject to this energy consumption estimation routine.

Next, the processor 350 conducts a difficulty level writing routine for establishing the difficulty level of the reference dance (step SD5). More specifically, the processor 350 serves as an energy-consumption data item generator for generating a data item indicating a value corresponding to the energy consumption estimated at step SD4. Furthermore, the processor 350 writes the data item as the difficulty-level data item 364 indicating the difficulty level of the reference dance into the volatile region R1. Thus, the play-difficulty-level setting apparatus 300 sets the difficulty level of a reference dance.

Then, the processor 350 of the play-difficulty-level setting apparatus 300 in collaboration with the communication interface 370 serves as a difficulty-level data outputter for transmitting the reference dance identifier 361, the step-sequence data element 363, and the difficulty-level data item 364 stored in the volatile region R1 of the in-apparatus memory unit 360 to the plurality of game terminals 200 belonging to the LAN 3 (step SD6). Afterward, the process returns to step SD1. Consequently, whenever a computer-readable portable storage medium storing a step-sequence data element and a step sequence identifier for the step-sequence data element is inserted into the loading slot 311, the routines from step SD2 through step SD6 are repeated.

On receipt of the reference dance identifier 361, the step-sequence data element 363, and the difficulty-level data item 364 from the play-difficulty-level setting apparatus 300 via the communication interface 270, the game terminal 200 writes them as a new reference dance identifier ID6, a new step-sequence data elements 163, and a new difficulty-level data item 164 into the rewritable area R22 of the in-terminal memory unit 160. Thus, in the game terminal 200, a new reference dance is added to increase the number of optional reference dances. Additionally, the game terminal 200 stores the difficulty level for the reference dance established in the play-difficulty-level setting apparatus 300.

The play-difficulty-level setting apparatus 300 sets the difficulty level of a reference dance, using the step-sequence data element describing the reference dance. Consequently, the play-difficulty-level setting apparatus 300 does not need assessments of the reference action-sequence by players for setting the difficulty level. Accordingly, the play-difficulty-level setting apparatus 300 can set an objective difficulty level of the reference dance with a reduced workload for the dance game.

In addition, since the game system 50 enables a play in accordance with the reference dance described by the step-sequence data element recorded in a computer-readable storage medium, users of the play-difficulty-level setting apparatus can become players who perform a play depending on the reference dance by preparing such a storage medium into which the step-sequence data element describing the reference dance made by the user is recorded. In addition, in the game system 50, since a step-sequence data element read from a storage medium by the reader is written into the rewritable area R22 of the in-terminal memory unit 160 as a new step-sequence data element 163, users can become players who play depending on the reference dance made by another person. Furthermore, in this play-difficulty-level setting apparatus 300, the difficulty level of a new reference dance made by a user of the game terminal is set on the basis of the step-sequence data element 363 describing the reference dance, so that the difficulty level of the reference dance is more objective than that determined on the basis of a report by the preparer of the reference dance.

The play-difficulty-level setting apparatus 300 may be modified such that a plurality of reference dance identifiers 361, step-sequence data elements 363 and difficulty-level data items 364 may be written into the volatile region R1 of the in-apparatus memory unit 360 of the play-difficulty-level setting apparatus 300 for a plurality of reference dance, and the routines from step SD2 through step SD6 are applied for those reference dances. The play-difficulty-level setting apparatus 300 may also be modified such that the reference dance identifier 361, the step-sequence data element 363, and the difficulty-level data item 364 may be received from outside of the play-difficulty-level setting apparatus 300, and upon receipt thereof, the play-difficulty-level setting apparatus 300 may write them into the volatile region R1 of the in-apparatus memory unit 360.

The game system 50 may be modified such that the play-difficulty-level setting apparatus 300 may be located outside the game place 2 and may communicate with a plurality of game terminals 200 located in a plurality of game places 2.

The play-difficulty-level setting apparatus 300 may be modified such that the processor 350 may cause the screen 321 to display the difficulty level indicated by the difficulty-level data item 364 stored in the volatile region R1 of the in-apparatus memory unit 360, instead of the transmission routine of step SD6. In this case, the processor 350 and the display device 120 serves as the aforementioned difficulty-level data outputter instead of the processor 350 and the communication interface 370.

Modifications

In the above-described embodiments, results of plays of the dance game depend on difficulty levels of reference dances. For such a computer game, high objectivity is required especially for setting difficulty levels of reference action-sequences. The present invention is based on such a potential requirement and can sufficiently enhance the objectivity of difficulty levels of reference action-sequences.

However, the present invention can be applied to another dance games in which results of plays do not depend on difficulty levels of reference dances. Even in such dance games, the set difficulty levels can be reference materials for players to choose a reference dance to be played.

In the above-described embodiments, reference dances prepared by players can be used by the players or by other players, but the present invention encompasses other embodiments in which reference dances prepared by players cannot be used.

In the above-described embodiments, player's actions for a play period are determined on the basis of operations of the manipulation interface by the player for the play period, but other suitable schemes may be used for determining player's actions. For example, player's actions can be determined using one or more sensors in a contact or noncontact manner that monitors player's actions and are not operated according to the intention of the player.

In the above-described embodiments, a specific dance game is described as an example of a computer game. The invention can also be applied to other dance games, for example, a dance game without outputting sound, or a dance game in which instructions of footsteps are given by sound, rather than moving pictures. Furthermore, the present invention can be applied not only dance games, but also to any other computer games in which a better evaluation is given to a player when conformity of actions of the player to the reference action-sequence is greater. Such computer games include a boxing game, a twister game (Twister), and a whack-a-mole game.

The play-difficulty-level setting apparatus 300 of the second embodiment is a single unit, but a play-difficulty-level setting apparatus may have plural units, for example, a unit for estimating energy consumption and another unit for generating a difficulty-level data item indicating the value corresponding to the estimated energy consumption.

In the foregoing, a specific embodiment of the present invention has been described; however, the present invention can also be implemented as a computer program including a sequence of machine-readable instructions describing the above-disclosed method performed at each game terminal, a computer program including a sequence of machine-readable instructions describing the method performed at play-difficulty-level setting apparatus 300, or a program product that bears each of these computer programs. A "program product" may be a computer-readable information-recording medium that has recorded therein the computer program or a data carrier for transmitting the computer program. The "information recording medium" can be, in addition to the above-described example, various discs, tapes, datachips, or datasticks. The "data carrier" can be various types of networks regardless of whether it is wired or wireless. A format of a computer program may be compiled or not compiled.

The invention claimed is:

1. A game terminal comprising:
an in-terminal memory device for storing, for each of a plurality of reference action-sequences, an action-sequence data element for describing a reference action-sequence, an identifier for identifying the reference action-sequence, and a difficulty-level data item for describing a difficulty level of the reference action-sequence in such a manner that the action-sequence data element, the identifier, and the difficulty-level data item of the reference action-sequence are mutually associated;
an information outputter for outputting, to the outside of the game terminal, for each of the plurality of reference action-sequences, a piece of information identifying a reference action-sequence and a piece of information describing the difficulty level of the reference action-sequence in such a manner that the pieces of information of the reference action-sequence are mutually associated on the basis of the identifiers for identifying the reference action-sequences and the difficulty-level data items;

an information input interface into which a person inputs information from outside of the game terminal;

a reference action-sequence selector for selecting one from among the plurality of reference action-sequences on the basis of the information input into the information input interface;

a play processor using the action-sequence data element describing the selected reference action-sequence to execute a process for realizing a play of a computer game, the play depending on the selected reference action-sequence;

a play evaluator for evaluating each play of the computer game and giving a better evaluation to a player when a conformity of actions of the player for a play period to the reference action-sequence is greater;

an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-terminal memory device;

an energy-consumption data item generator for generating a data item describing a value corresponding to the estimated energy consumption for the at least one reference action-sequence; and a difficulty-level data writer for writing, into the in-terminal memory device, the data item describing the value corresponding to the estimated energy consumption as the difficulty-level data item describing the difficulty level of the reference action-sequence.

2. The game terminal of claim 1, further comprising:
a reader for reading data from a portable storage medium that is computer-readable; and
a reference-action-sequence data writer for writing, into the in-terminal memory device, the read data as a new action-sequence data element describing a new reference action-sequence.

3. The game terminal of claim 1, wherein the play evaluator gives a better evaluation to a player when the difficulty level of the reference action-sequence selected by the player is greater in each play of the computer game.

4. The game terminal of claim 1, further comprising:
a manipulation interface manipulated by a person; and
an action determiner for determining actions of a player for a play period of each play of the computer game on the basis of manipulations of the manipulation interface.

5. The game terminal of claim 1, wherein the energy-consumption estimator for estimating energy consumption of a hypothetical player for at least one of the plurality of reference action-sequences uses an algorithm on the basis of the action-sequence data element describing the at least one reference action-sequence stored in the in-terminal memory device and a statistic of energy consumption needed for each action included in the reference action-sequence, assuming that the hypothetical player's actions conform with the reference action-sequence.

6. A play-difficulty-level setting apparatus comprising:
an in-apparatus memory device for storing at least one action-sequence data element describing at least one reference action-sequence that is the same as an action-sequence data element used in a game terminal of a computer game;

an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-apparatus memory device;

an energy-consumption data item generator for generating a data item describing a value corresponding to the estimated energy consumption for the at least one reference action-sequence; and a difficulty-level data outputter for outputting, to the outside of the play-difficulty-level setting apparatus, the data item describing the value corresponding to the estimated energy consumption as the difficulty-level data item describing the difficulty level of the reference action-sequence.

7. The play-difficulty-level setting apparatus of claim 6, further comprising:
a reader for reading data from a portable storage medium that is computer-readable; and
a reference-action-sequence data writer for writing, into the in-apparatus memory device, the read data as a new action-sequence data element describing a new reference action-sequence.

8. The play-difficulty-level setting apparatus of claim 6, wherein the energy-consumption estimator for estimating energy consumption of a hypothetical player for at least one of the plurality of reference action-sequences uses an algorithm on the basis of the action-sequence data element describing the at least one reference action-sequence stored in the in-terminal memory device and a statistic of energy consumption needed for each action included in the reference action-sequence, assuming that the hypothetical player's actions conform with the reference action-sequence.

9. A non-transitory computer readable medium encoded with instructions comprising a computer program used in a game terminal comprising:
an in-terminal memory device for storing, for each of a plurality of reference action-sequences, an action-sequence data element for describing a reference action-sequence, identifier for identifying the reference action-sequence, and a difficulty-level data item for describing a difficulty level of the reference action-sequence in such a manner that the action-sequence data element, the identifier, and the difficulty-level data item of the reference action-sequence are mutually associated;

an information outputter for outputting, to outside the game terminal, for each of the plurality of reference action-sequences, a piece of information identifying a reference action-sequence and a piece of information describing the difficulty level of the reference action-sequence in such a manner that the pieces of information of the reference action-sequence are mutually associated on the basis of the identifiers for identifying the reference action-sequences and the difficulty-level data items;

an information input interface into which a person inputs information from outside of the game terminal;

a reference action-sequence selector for selecting one from among the plurality of reference action-sequences on the basis of the information input into the information input interface;

a play processor using the action-sequence data element describing the selected reference action-sequence to execute a process for realizing a play of a computer game, the play depending on the selected reference action-sequence; and a play evaluator for evaluating each play of the computer game and giving a better evaluation to a player when a conformity of actions of the player for a play period to the reference action-sequence is greater, the computer program causing the game terminal to serve as:

an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-terminal memory device;

an energy-consumption data item generator for generating a data item describing a value corresponding to the estimated energy consumption for the at least one reference action-sequence; and a difficulty-level data writer for writing, into the in-terminal memory device, the data item describing the value corresponding to the estimated energy consumption as the difficulty-level data item describing the difficulty level of the reference action-sequence.

10. The non-transitory computer readable medium of claim 9, wherein the energy-consumption estimator for estimating energy consumption of a hypothetical player for at least one of the plurality of reference action-sequences uses an algorithm on the basis of the action-sequence data element describing the at least one reference action-sequence stored in the in-terminal memory device and a statistic of energy consumption needed for each action included in the reference action-sequence, assuming that the hypothetical player's actions conform with the reference action-sequence.

11. A non-transitory computer readable medium encoded with instructions comprising a computer program used in a play-difficulty-level setting apparatus which is different from a game terminal of a computer game, the computer program causing the play-difficulty-level setting apparatus to serve as:

an in-apparatus memory device for storing at least one action-sequence data element describing at least one reference action-sequence that is the same as an action-sequence data element used in the game terminal of the computer game;

an energy-consumption estimator for estimating energy consumption of a hypothetical player, assuming that the hypothetical player performs at least one of the plurality of reference action-sequences for a play period, on the basis of the action-sequence data element describing the at least one reference action-sequence stored in the in-apparatus memory device;

an energy-consumption data item generator for generating a data item describing a value corresponding to the estimated energy consumption for the at least one reference action-sequence; and a difficulty-level data outputter for outputting, to the outside of the play-difficulty-level setting apparatus, the data item describing the value corresponding to the estimated energy consumption as the difficulty-level data item describing the difficulty level of the reference action-sequence.

12. The non-transitory computer readable medium of claim 11, wherein the energy-consumption estimator for estimating energy consumption of a hypothetical player for at least one of the plurality of reference action-sequences uses an algorithm on the basis of the action-sequence data element describing the at least one reference action-sequence stored in the in-terminal memory device and a statistic of energy consumption needed for each action included in the reference action-sequence, assuming that the hypothetical player's actions conform with the reference action-sequence.

* * * * *